US006810626B2

(12) United States Patent
Meyer et al.

(10) Patent No.: US 6,810,626 B2
(45) Date of Patent: Nov. 2, 2004

(54) FIRE PROTECTION DEVICE FOR BUILDING STRUCTURE

(75) Inventors: Thomas I. Meyer, Annapolis, MD (US); Henry F. Kessler, Ellicott City, MD (US)

(73) Assignee: Meyer and Associates in Sea Technology, Inc., Annapolis, MD (US)

( * ) Notice: Subject to any disclaimer, the term of this patent is extended or adjusted under 35 U.S.C. 154(b) by 66 days.

(21) Appl. No.: 10/225,413

(22) Filed: Aug. 22, 2002

(65) Prior Publication Data

US 2004/0035059 A1 Feb. 26, 2004

(51) Int. Cl.$^{7}$ ................................................ B62D 63/04

(52) U.S. Cl. ...................... 52/1; 52/23; 52/168; 52/232

(58) Field of Search ............................ 52/1, 3, 23, 168, 52/DIG. 12, 232; 169/50, 61; 160/120

(56) References Cited

U.S. PATENT DOCUMENTS

| | | | | | |
|---|---|---|---|---|---|
| 162,250 | A | | 4/1875 | Moore | |
| 2,365,127 | A | | 12/1944 | Wagner | |
| 3,715,843 | A | | 2/1973 | Ballinger | |
| 3,766,958 | A | * | 10/1973 | Mitchell | 160/84.02 |
| 3,973,074 | A | | 8/1976 | de Lissa et al. | |
| 4,033,367 | A | | 7/1977 | Johnston | |
| 4,170,675 | A | * | 10/1979 | Greengrass | 428/109 |
| 4,198,328 | A | | 4/1980 | Bertelli et al. | |
| 4,265,806 | A | | 5/1981 | Grundmann et al. | |
| 4,597,450 | A | * | 7/1986 | Budmiger | 169/50 |
| 4,858,395 | A | * | 8/1989 | McQuirk | 52/3 |
| 5,423,150 | A | | 6/1995 | Hitchcock | |
| 5,522,198 | A | | 6/1996 | Byer et al. | |
| 5,608,992 | A | | 3/1997 | Floyd | |
| 5,630,296 | A | | 5/1997 | Kendall, Jr. | |
| 5,732,511 | A | * | 3/1998 | Scott | 52/1 |
| 5,748,072 | A | | 5/1998 | Wang | |
| 5,791,090 | A | * | 8/1998 | Gitlin et al. | 52/4 |
| 5,829,200 | A | * | 11/1998 | Jones et al. | 52/3 |
| 5,850,876 | A | * | 12/1998 | Allison et al. | 169/61 |
| 5,860,251 | A | | 1/1999 | Gleich | |
| 6,125,941 | A | * | 10/2000 | Lokken | 169/50 |
| 6,613,391 | B1 | * | 9/2003 | Gang | 427/415 |

OTHER PUBLICATIONS

Print–out copy of Home Fire Shield Internet Website (http://www.catalog.com/conceive/wildfire/).

"Automatic Fire Shield for Homes," *Popular Mechanics*, (http://popularmechanics/com/popmech/sci/tech/9703TU-TWFM.html), Mar. 1997.

"A Safety blanket for your house: This new technology will save an estimated $1 billion in fire damage," *Taipan Technology*, Jul. 1997 (http://www.taipanonline.com/archive/0797/0797tech1.html).

"State Opens Internet Option for Businesses Raising Equity" by Jennifer Beauprez, *Crain's Cleveland Business Archives*, May 10, 1999.

* cited by examiner

*Primary Examiner*—Carl D. Friedman
*Assistant Examiner*—Basil Katcheves
(74) *Attorney, Agent, or Firm*—Finnegan Henderson Farabow Garrett & Dunner, L.L.P.

(57) ABSTRACT

Fire protection devices and related methods for isolating building structures from an external fire are disclosed. The fire protection device includes a rolled fire-resistant protective cover having dimensions large enough to cover the building structure. The protective cover is then stored in a storage bag storing the protective cover and being disposed on a inclined top surface of the building structure. The device includes means for releasing the rolled protective cover from the storage bag so that, upon release from the storage bag, the protective cover can roll down the inclined top surface by gravity.

28 Claims, 6 Drawing Sheets

FIRE PROTECTION DEVICE FOR BUILDING STRUCTURE

DESCRIPTION OF THE INVENTION

1. Field of the Invention

The present invention relates to fire protection devices, and related deployment methods. In particular, the present invention relates to a fire resistant protective cover used for enveloping a building structure from an external source of fire.

2. Background of the Invention

Every year, a great number of people lose their valuable properties due to uncontrolled external fires, such as forest fires and wind-driven fires. Since these external fires are spreading very rapidly, it becomes extremely difficult for firefighters to control or contain them. Furthermore, because of such rapid movements of these fires, homeowners in the midst of these fires are not given enough time to relocate their valuable belongings to a safe place or to take sufficient measures to protect their homes. Therefore, they have to evacuate out of the area in a hurry, abandoning their valuable properties behind them.

In order to protect building structures, including homes, from these uncontrolled external fires, there have been numerous attempts to develop fire protection devices which can isolate the building structures from these external fires. In particular, various systems and methods for enclosing the building structures from surrounding external fires by placing fire resistant materials over building structures have been proposed and utilized.

However, the prior art devices and methods generally involve impractical, complicated deployment mechanisms and/or require external power sources for deployment which are often unavailable.

SUMMARY OF THE INVENTION

Therefore, it is accordingly a primary object of the invention to provide a fire protection device with a simple and reliable deployment system that does not rely on any external power source. This is achieved by utilizing a rolled fire protective cover disposed on a inclined top surface of a building structure which can be readily deployed via gravity without requiring any other external power source for deployment.

To attain the advantages and in accordance with the purpose of the invention, as embedded and broadly described herein, one aspect of the invention provides a fire protection device for isolating a building structure from an external fire. The device includes a rolled fire-resistant protective cover having dimensions large enough to cover the building structure. The protective cover is stored in a storage bag, and the storage bag is disposed on an inclined top surface of the building structure. The device also includes means for releasing the rolled protective cover from the storage bag so that, upon release from the storage bag, the protective cover can roll down the inclined top surface by gravity.

In another aspect of the present invention, a method of enveloping a building structure from an external fire is provided. The building structure preferably has at least one inclined top surface. The method includes providing a rolled fire-resistant protective cover having dimensions large enough to cover the building structure, and disposing the rolled protective cover inside a storage bag. The method also includes placing the storage bag on the inclined top surface, and releasing the rolled protective cover out of the storage bag, so that the rolled protective cover can roll down the top surface by gravity.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

In the drawings.

DESCRIPTION OF THE EMBODIMENTS

Figure 1:
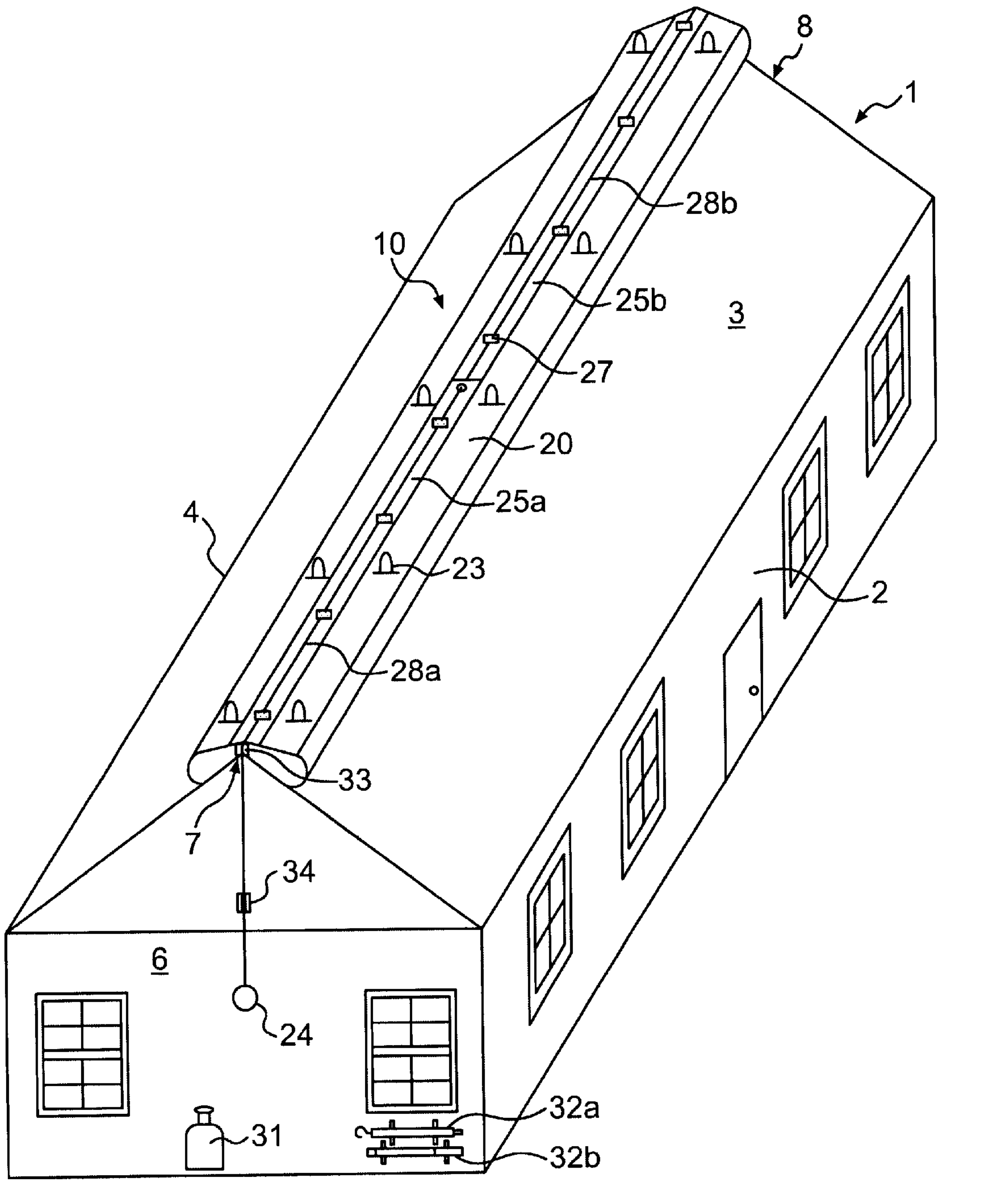
FIG. 1 is a perspective view of a building structure having a fire protection device installed on the roof, according to an embodiment of the present invention.

Reference will now be made in detail to an exemplary embodiment of the invention, examples of which are illustrated in the accompanying drawings. Wherever possible, the same reference numbers will be used throughout the drawings to refer to the same or like parts.

In accordance with the present invention, a fire protection device for isolating a building structure, preferably having at least one inclined top surface, from an external fire is provided. The device includes a rolled fire-resistant protective cover having dimensions large enough to cover the building structure and being stored and disposed on the inclined top surface. The device also includes means for releasing the rolled protective cover from the storage bag, such that, upon release from the storage bag, the protective cover can roll down the inclined top surface by gravity.

FIGS. 1–4 show a fire protection device 10 used for protecting a building structure 1 from an external source of fire, according to an embodiment of the present invention. The figure illustrates the fire protection device 10 installed on the building structure 1 prior to deployment. The device 10 can be installed on the highest elevational location of the building structure 1, such as a roof ridge 7. In the illustrated embodiment, the device 10 includes a storage bag 20 which contains a fire-resistant protective cover 40 used for enveloping the building structure 1 from an external fire. A plurality of lifting loops 23 may be provided on the storage bag 20 to facilitate handling and placement of the storage bag 20 on the roof ridge 7 of the building structure 1. Preferably, the building structure 1 has a declined roof surface 3 to take advantage of natural gravity force during deployment, as will be described later.

Figure 2B:
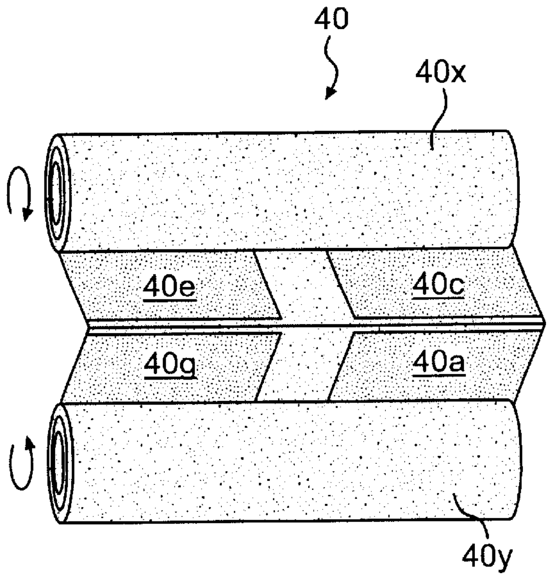
FIG. 2B is a perspective view of the protective cover of FIG. 2A, illustrating a state in which the protective cover is rolled in prior to placement in a storage bag, according to an embodiment of the present invention.
Figure 2A:
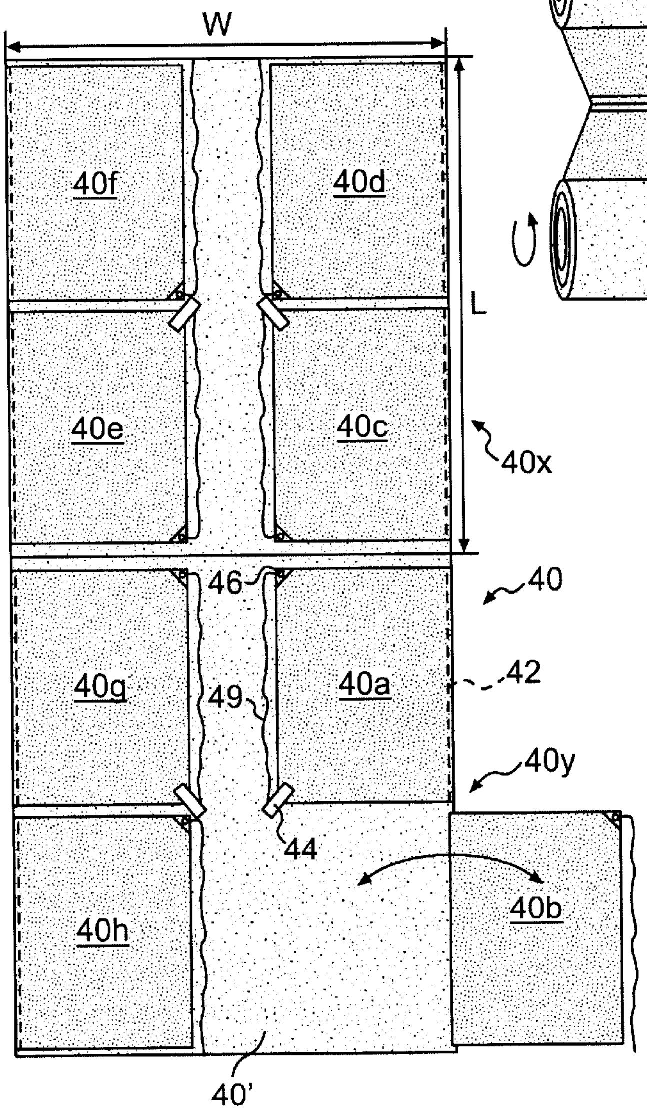
FIG. 2A is a plan view of a fire-resistant protective cover used for enveloping a building structure, according to an embodiment of the present invention.
Figure 2C:
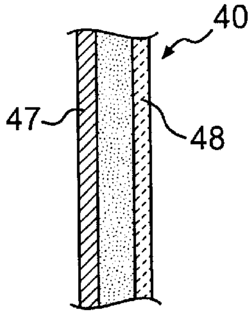
FIG. 2C is a cross-sectional view of a fire-resistant protective cover used for enveloping a building structure, according to an embodiment of the present invention.

As shown in FIG. 2A–2C, the protective cover 40 is comprised of a main cover 40' and a plurality of end flaps **40*a*–40*h*. The protective cover 40 is preferably custom-made to fit the geometric shape of any given building structure. In this embodiment, for example, the main cover 40' is designed to cover the roof surface 3 and the front and rear surfaces 2, 4 of the building structure 1, and the plurality of end flaps 40*a*–40*h* are designed to cover the side surfaces 6, 8 of the building structure 1. More specifically, the length L and the width W of the main cover 40' is dimensioned to fit the dimensions of the roof surface 3 and the front and rear surfaces 2, 4 of the building structure 1**.

Figure 7:
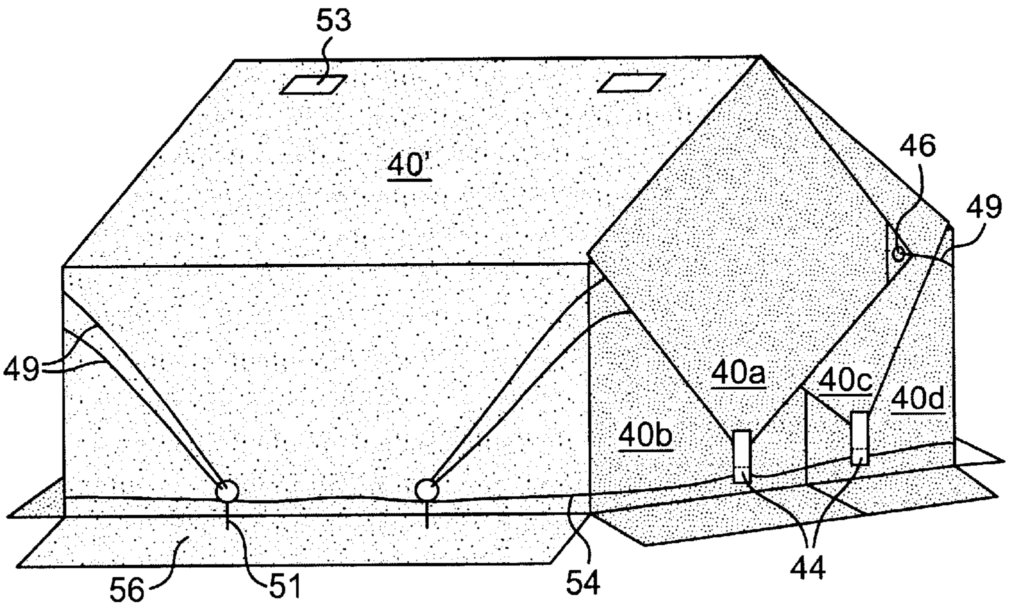
FIG. 7 is a perspective view of the building structure showing the protective cover completely enveloping the building structure, according to an embodiment of the present invention.
Figure 8:
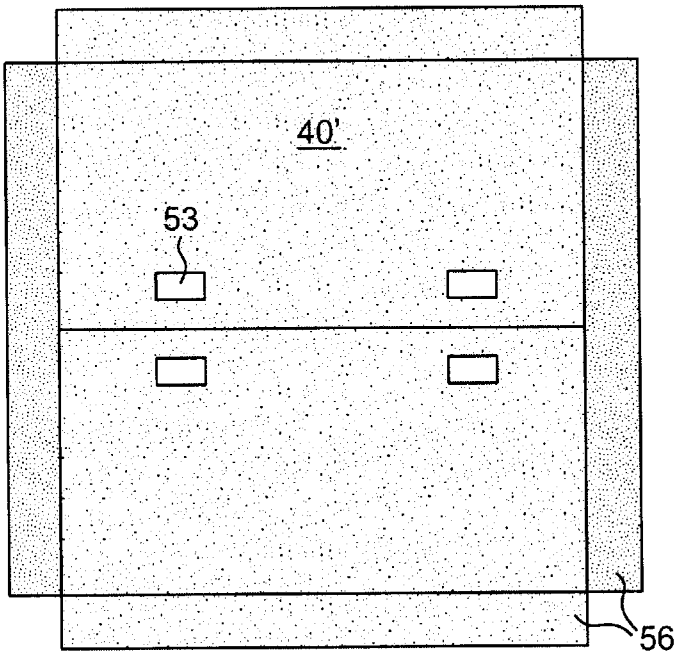
FIG. 8 is a top view of the building structure showing the protective cover completely enveloping the building structure, according to an embodiment of the present invention.

As shown in FIG. 2A, outer edge portion 42 of each end flap **40*a*–40*h* is fixedly attached and thereby hinged to an edge portion of the main cover 40'. Each end flap 40*a*–40*h* can then be unfolded to extend outwardly to cover the side surfaces 6, 8 of the building structure 1. In order to facilitate handling of the end flaps 40*a*–40*h*, a top corner portion of each end flap 40*a*–40*h* is provided with an opening 46 and a tie-down rope 49 connected to the opening 46. A bottom corner portion of each end flap 40*a*, 40*c*, 40*e*, 40*g* is provided with a retention tab 44 having an opening. The retention tabs 44 are used to secure the end flaps 40*a*, 40*c*, 40*e*, 40*g* in place when installed, as shown in FIG. 7**. Preferably, the top and bottom corner portions are reinforced with a rigid material for enhanced durability.

As shown in FIG. 2B, each side **40*x*, 40*y* of the protective cover 40, including the main cover 40' and the plurality of end flaps 40*a*–40*h*, can be rolled to be stored in the storage bag 20 in a self-deployable manner. When the rolled protective cover 40 is placed in the storage bag 20 on an inclined roof surface 3, the storage bag 20 can be opened to allow the protective cover 40 to roll down the roof surface 3** by gravity without requiring any external power source for the deployment.

The protective cover 40 is constructed to provide sufficient heat-resistance against an external fire, such as a forest fire or a wind-driven fire. The protective cover 40 is preferably made of a light-weight material in order not to place any undue load upon the building structure 1, yet provides adequate tensile and shear strengths under high temperature condition of a forest fire or a wind-driven fire. Examples of such material are Kevlar® and/or Nomex® fibers, which have been tested and proven to be adequate for such a fire-protection service. However, it must be understood that any other materials having similar material characteristics can also be utilized.

As shown in FIG. 2C, a highly heat reflective coating 47 can be applied on the outer surface of the protective cover 40 to reflect heat from an external fire. On the inside surface of the protective cover 40, a special intumescent coating 48 can also be applied, such that, when heated by an external fire, the coating liberates a fire inhibiting gas, such as, for example, carbon dioxide ($CO_2$) gas. The liberated gas, in turn, produces a fire-resistant foam between the protective cover 40 and the exterior surface of the building structure 1, thereby providing an additional fire protection measure. The intumescent coating 48 is designed to be activated only at a prescribed threshold temperature which can only be induced by a fire. Additional fire-inhibiting gas (e.g., $CO_2$ gas) can be provided in a pressurized tank 31 located proximate to the building structure 1. When released, the fire inhibiting gas, being heavier than air, replaces the air existing in the space between the protective cover 40 and the building structure 1 by forcing the air upward and ventilating through venting holes 53 (see FIG. 7).

The storage bag 20 is preferably made aesthetically pleasing since it can be permanently installed on a building structure 1. The storage bag 20 is preferably made of a water-, ozone-, and UV-resistant material, such as, for example, a Nomax® material, that provides a barrier against water-, ozone- and UV-related damages. The storage bag 20 may also be provided with insect- and/or animal-repelling chemicals to repel rodent, birds, and/or insects. Thus, the storage bag 20 prevents potential deteriorating effects to the protective covers 40 induced by continuous harsh outdoor environment existing in the building structure 1.

Figure 3:
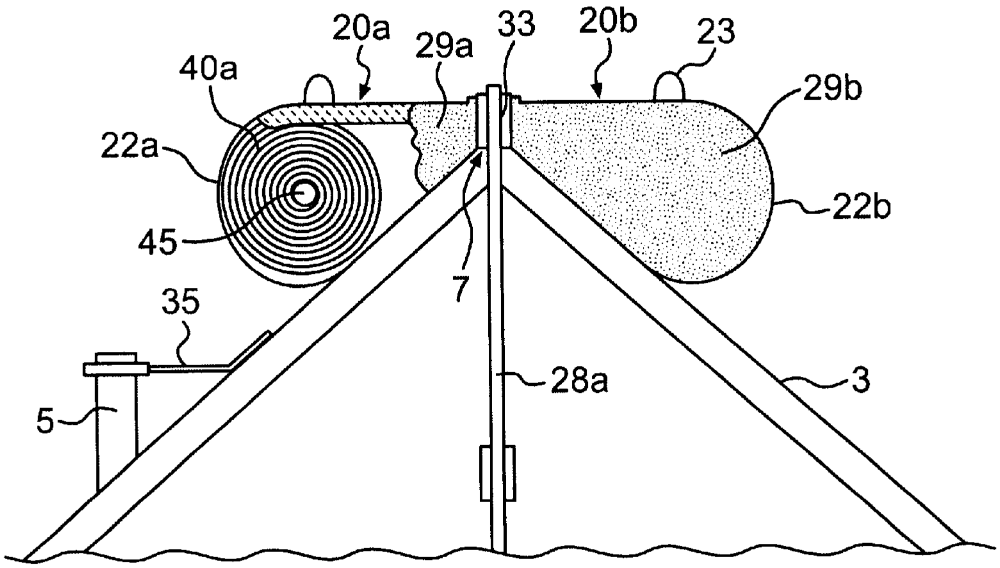
FIG. 3 is a partial side view of a storage bag, according to an embodiment of the present invention.
Figure 4:
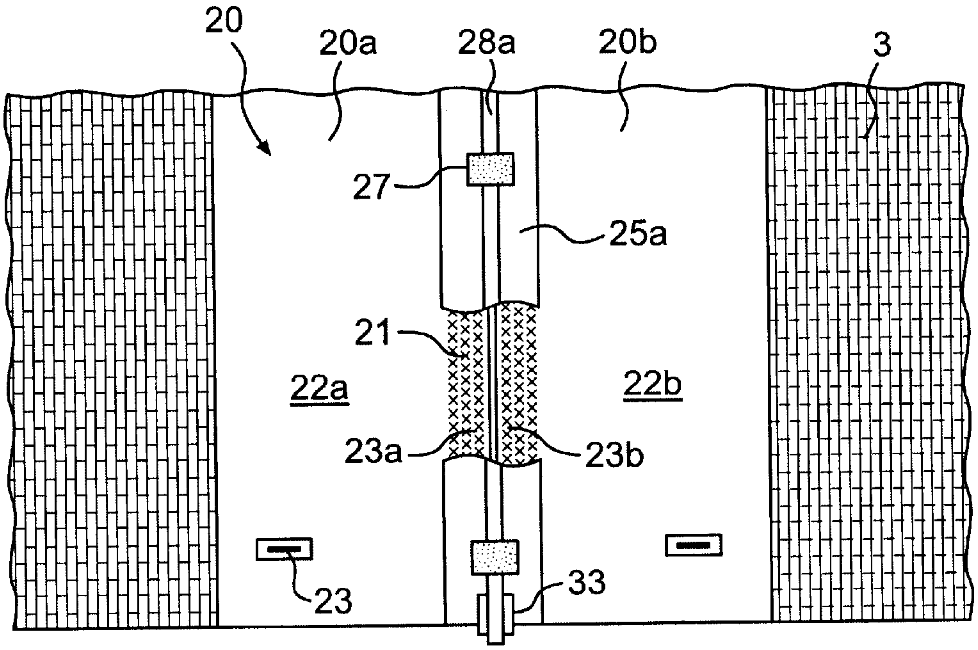
FIG. 4 is a partial top view of a storage bag, according to an embodiment of the present invention.

As shown in FIGS. 3 and 4, the storage bag 20 preferably has two storage pouches **20*a*, 20*b*, each of which includes a foldable flap 22*a*, 22*b* and an end cap 29*a*, 29*b*. The foldable flaps 22*a*, 22*b* are detachably held together along the outer edge portions 23*a*, 23*b*, and end caps 29*a*, 29*b* are removably attached on both side ends of the foldable flaps 22*a*, 22*b* to seal off the storage pouches 20*a*, 20*b* from the side ends. As shown in FIG. 3, each half 40*x*, 40*y* of the protective cover 40 is rolled and stored inside each storage pouch 20*a*, 20*b*, such that, upon its release from the storage bag 20, it can roll down the roof surface 3 by natural gravity force. A weighted rod 45 can be provided in the center of the rolled half 40*x*, 40*y* of the protective cover 40 to assist the roll-down of the protective cover 40. The weighted rod 45** is preferably covered with a protective tubing and/or a coating to prevent chafing.

As shown in FIG. 4, the foldable flap **22*a*, 22*b* of the two storage pouches 20*a*, 20*b* are held together by two release straps 25*a*, 25*b* that are removably attached to the outer edge portions 23*a*, 23*b* of the foldable flaps 22*a*, 22*b*. Suitable attachment means, such as, for example, a hook-and-loop-type fastener 21 or a zipper, is provided between the outer edge portions 23*a*, 23*b* and the release straps 25*a*, 25*b*. Each of the two release straps 25*a*, 25*b* extends from respective side end of the roof ridge 7 to approximately halfway through the length of the roof ridge 7, as shown in FIG. 1. To facilitate detachment of the release straps 25*a*, 25*b*, release ropes 28***a*, 28*b* are attached to the respective release straps 25*a*, 25*b* with a plurality of rope guides 27. Preferably, one end of each release rope 28*a*, 28*b* is fixed to one end portion of the release strap 25*a*, 25*b* positioned in the middle portion of the storage bag 20, so that, when the release ropes 28*a*, 28*b* are pulled, the detachment of the release straps 25*a*, 25*b* begins in the center portion of the roof ridge 7. Preferably, a portion of the each release strap 25*a*, 25*b* is coupled to the respective end cap 29*a*, 29*b* so that the end caps 29*a*, 29*b* can be removed together with the release straps 25*a*, 25*b* by pulling the release ropes 28*a*, 28*b*. The other end of the each release rope 28*a*, 28*b* preferably extends down to a lower elevation and is coupled a ring 24, so that an operator can readily grapple the release rope 28*a*, 28*b* from the ground level. The release ropes 28*a*, 28*b* extended down to side surfaces 6, 8 of the building structure 1 are held on the side surfaces 6, 8 by rope retainers 34. Extendable retrieval poles 32*a*, 32*b* for lowering and pulling the release ropes 28*a*, 28*b* can also be disposed on the building premises. On each side edge portion of the roof ridge 7, a rope guide 33, such as, for example, a roller or slider, for guiding the release rope 28*a*, 28*b* is provided to assist pulling of the release rope 28*a*, 28*b*.

During deployment, by pulling the release ropes 28*a*, 28*b* from both side ends of the building structure 1, the release straps 25*a*, 25*b*, together with the end caps 29*a*, 29*b*, are removed from the foldable flaps 23*a*, 23*b* of the storage pouches 20*a*, 20*b*. When the release straps 25*a*, 25*b* and the end caps 29*a*, 29*b* are removed, the foldable flaps 22*a*, 22*b* flap open by the weight of the protective cover 40 and lay flat against the roof surface 3. The each half 40*x*, 40*y* of the protective cover 40 is then rolls down the roof surface 3 by gravity without requiring any external deployment power source. The weighed rod 45 provides additional weight to the protective cover 40 for more rapid and reliable roll-down. In case where obstructing objects, such as pipe stacks 5 for ventilation, protrude out of the roof surface 3, suitable devices, such as metal straps 35, may be provided to permit the protective cover 40 to ride over the obstructing objects during the deployment.

In accordance with the present invention, a method of enveloping a building structure having at least one inclined top surface is provided. The method includes providing a rolled fire-resistant protective cover having dimensions large enough to cover the building structure, and disposing the rolled protective cover inside a storage bag. The storage bag containing the rolled protective cover is placed on the inclined top surface. The rolled protective cover is then released out of the storage bag, so that the rolled protective cover can roll down the top surface by gravity.

Figure 5:
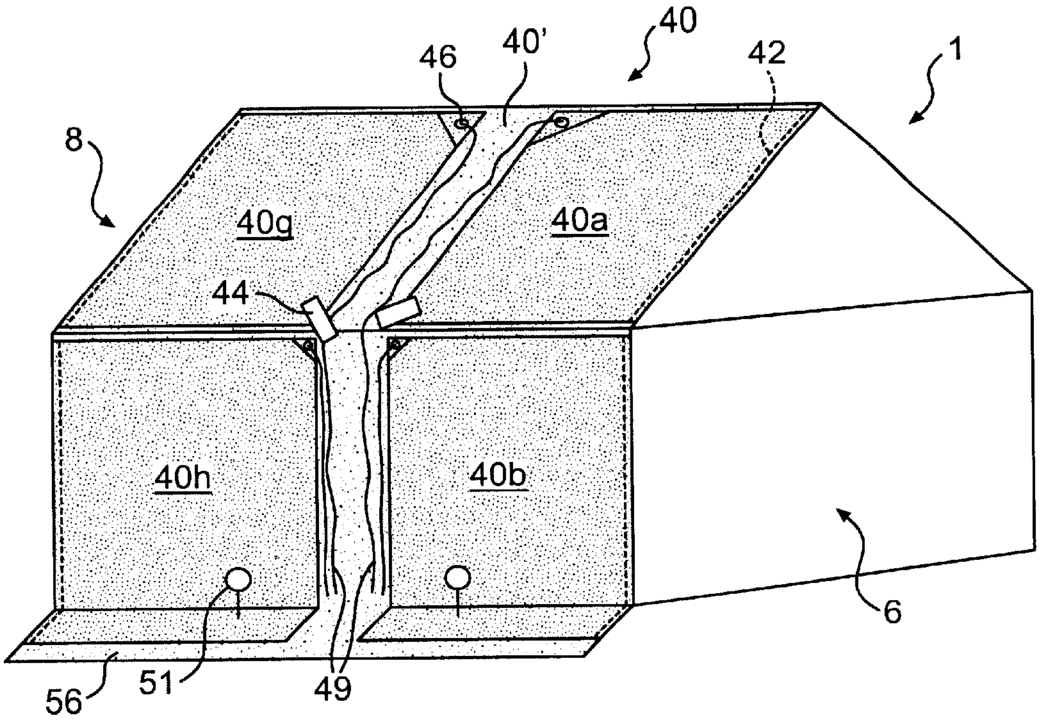
FIG. 5 is a perspective view of the building structure with the protective cover being released from the storage bag, according to an embodiment of the present invention.
Figure 6:
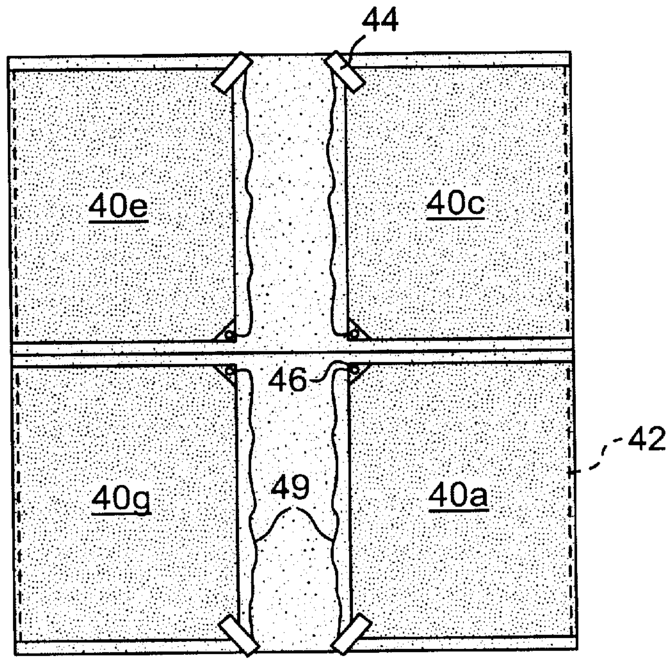
FIG. 6 is a top view of the building structure with the protective cover being released from the storage bag, according to an embodiment of the present invention.

With reference to FIGS. 5–8, the method of enveloping the building structure 1 with the deployed protective cover 40 are described herein. FIGS. 5 and 6 illustrate an interim position of the protective cover 40 after being released out of the storage bag 20 and rolled down the roof surface 3. In the interim position, the end flaps 40*a*–40*h* remain folded against the main cover 40' and the protective cover 40 covers the roof surface 3 and the front and back surfaces 2, 4 of the building structure 1.

In the illustrated embodiment, the end flaps 40*b*, 40*d*, 40*f*, 40*h* positioned on the front and back surfaces 2, 4 in the interim position (i.e., shown in FIG. 5) of the building structure 1 are first unfolded from the main cover 40' and placed against the respective side surfaces 6, 8 of the building structure 1, as shown in FIG. 7. The tie-down ropes 49, positioned preferably with assistance of retrieval poles 32*a*, 32*b*, are then securely tied to a plurality of anchoring members 51, such as, for example, eyed auger screws, located nearby the building structure 1. Once the end flaps 40*b*, 40*d*, 40*f*, 40*h* are securely positioned, the end flaps 40*a*, 40*c*, 40*g*, 40*e* positioned on the roof surface 3 in the interim position (i.e., shown in FIG. 5) are unfolded from the main cover 40' and placed against the respective side surfaces 6, 8 of the building structure 1. Again, the tie-down ropes 49 are securely tied to the respective anchoring members 51 located nearby the building structure 1. It should be understood that the end flaps 40*a*, 40*c*, 40*e*, 40*g* can be first placed against the side surfaces 6, 8 before the end flaps 40*b*, 40*d*, 40*f*, 40*h*. Once end flaps 40*a*, 40*c*, 40*e*, 40*g* are securely positioned in place, the openings of the retention tabs 44 in the end flaps 40*a*, 40*c*, 40*e*, 40*g* are aligned parallel with respect to a retention rope 54 provided around the perimeter of the building structure 1, such that the retention rope 54 can be threaded through the openings of the retention tabs 44 to securely retain the end flaps 40*a*, 40*c*, 40*e*, 40*g* in place.

The tie-down ropes 49 and the retention ropes 54 are made of a material that is highly resistant to the heat of a fire. A ground apron 56 is provided around the building structure 1 in order to provide a fire shield around the entire ground perimeter of the building structure 1. Preferably, the apron 56 is formed by excess materials of the main cover 40' and the end flaps 40*b*, 40*d*, 40*f*, and 40*h*. Thus, the entire building structure 1 is protected from the ground level to the top of the building structure 1. The apron 56 also allows the retention rope 54 to nestle in the corner of the building structure 1 and the ground. FIG. 7 shows the building structure 1 being completely enveloped with the fire-resistant protective cover 40.

Figure 9:
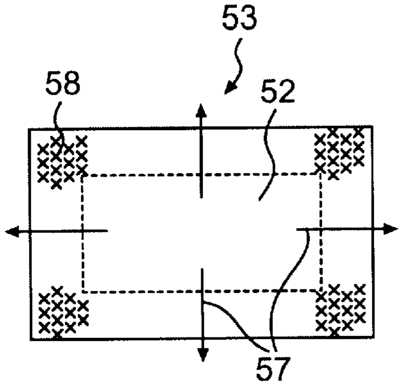
FIG. 9 is an exploded view of a venting hole and a venting flap, according to an embodiment of the present invention.

When the building structure 1 is completely enveloped, the fire-inhibiting gas stored in the pressurized tank 31 can be released slowly via metered valve of the tank 31 into the space between the protective cover 40 and the exterior surface of the building structure 1. The released fire-inhibiting gas then forces the air between the protective cover 40 and the building structure 1 out of the plurality of venting holes 52 located on the top portion of the main cover 40'. FIG. 9 shows an exploded view of the venting hole 52 and the venting flap 53. The venting flaps 53 are attached on the peripheral edge of the venting holes 52 to cover the venting holes 52. The venting flaps 53 provide flow paths 57 which allow sufficient ventilation of the air out of the space between the protective cover 40 and the building structure 1. The venting flaps 53 can be permanently attached to the main cover 40' or removably attached by using a suitable attachment means, such as, for example, a hook-and-loop fastener 58.

It should be understood that, after the external fire is either extinguished, passed by, or burned out, the protective cover 40 can be repacked in the storage bag 20 and replaced again on the building structure 1.

Figure 10:
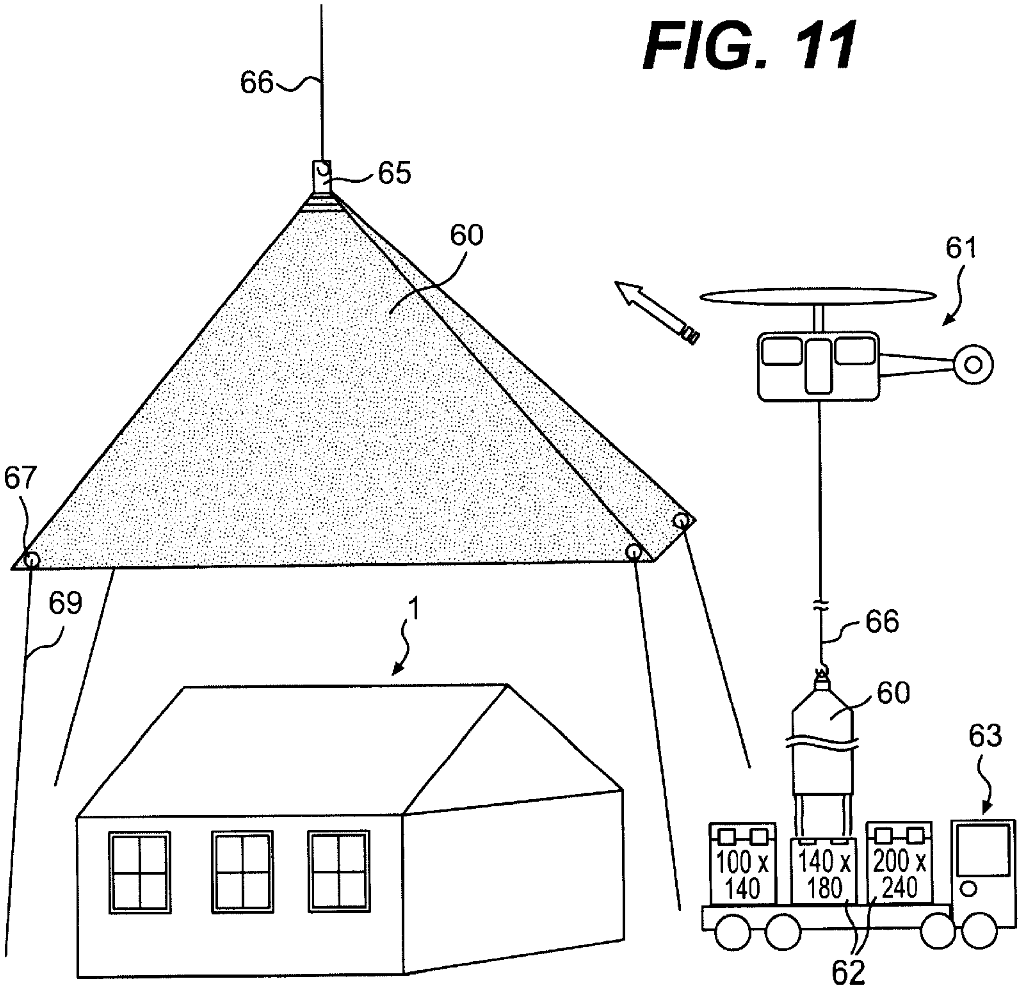
FIG. 10 is a schematic illustration of an alternative deployment method for enveloping a building structure, according to another embodiment of the present invention.

FIG. 10 illustrates an alternative deployment method for enveloping a building structure 1, according to another embodiment of the present invention. In this embodiment, a protective cover 60 is deployed on site by a truck's crane (not shown) or a helicopter 61. This also allows the fire protective cover 60 to be deployed on a building structure 1 having a flat roof surface.

Figure 11:
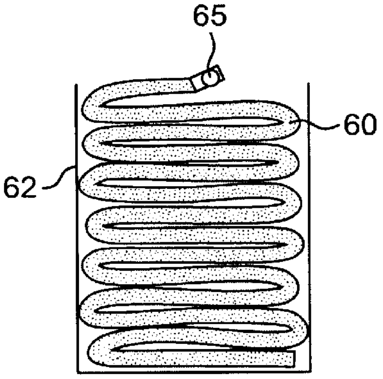
FIG. 11 is a cross-sectional view of a storage container containing a protective cover.

As shown in FIG. 11, the protective cover 60 is folded in layers inside the storage container 62. The protective cover 60 stored in the storage container can then be readily transported onto a threatened site by a truck 63 or a trailer. The storage container 62 can be strategically stored at a local fire department, a local government facility, or any other suitable fire-extinguishing authority. Preferably, each storage container 62 contains a protective cover 60 of different size to accommodate various different sizes of building structures in the threatened area. The protective cover 60 preferably forms conical or pyramid shape to be used on any building structure 1, regardless of its geometric shape. On the vertex of the protective cover 60, a lifting loop 65 is provided to facilitate handling of the protective cover 60.

During deployment, the lid of the storage container 62 is removed and a hoisting device 66 of a crane or a helicopter 61 is connected to the lifting loop 65 of the protective cover 60. The protective cover 60 is then lifted above the building structure as shown in FIG. 10. The bottom end portion of the protective cover 40 is provided with, preferably, four openings 67, to each of which is connected with tie-down rope 69. Each crew member on the ground holds each tie-down rope 69, extends outwardly as the protective cover 60 is lowered, and anchors it to the ground to envelope the building structure 1.

It will be apparent to those skilled in the art that various modifications and variations can be made in the fire protection device and method of the present invention and in construction of this device without departing from the scope or spirit of the invention. For example, while a building structure 1 having a simple geometrical shape is used for simplicity to describe the fire protection device 10 and its related deployment methods of the present invention, it should be understood that those skilled in the art can readily apply the fire protection device 10 of the present invention to other structures having more complicated shapes by appropriate modifications available within the scope and spirit of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fire protection device for use in isolating a building structure having at least one inclined top surface from an external fire, the device comprising:

a rolled fire-resistant protective cover having dimensions large enough to cover the building structure, the protective cover including an intumescent coating on the inner surface of the protective cover, the intumescent coating configured to release a fire-suppressing gas upon activation;

a storage bag storing the protective cover and being disposed on the inclined top surface; and means for releasing the rolled protective cover from the storage bag, wherein, upon release from the storage bag, the protective cover rolls down the inclined top surface by gravity.

2. A fire protection device as defined in claim 1, wherein the protective cover is rolled around a weighted rod.

3. A fire protection device as defined in claim 1, further comprising at least one lifting loop disposed on the storage bag for handling of the storage bag.

4. A fire protection device as defined in claim 1, wherein at least one of the storage bag and the protective cover has a material characteristic that resist at least one of water, ozone, and UV.

5. A fire protection device as defined in claim 1, wherein at least one of the storage bag and the protective cover includes a material that protects against at least one of rodent, birds, and insects.

6. A fire protection device as defined in claim 1, wherein each half of the protective cover is rolled with respect to the center of the protective cover.

7. A fire protection device as defined in claim 6, wherein the storage bag includes first and second foldable flaps, each of the first and second foldable flaps wrapping each rolled half of the protective cover.

8. A fire protection device as defined in claim 7, wherein outer edge portion of the first and second foldable flaps are held together by a removable release strap so that, when the release strap is removed, each of the first and second storage pouches separates from each other to open and release each rolled half of the protective cover.

9. A fire protection device as defined in claim 8, wherein a release rope is fixedly attached to at least a portion of the removable release strap.

10. A fire protection device as defined in claim 9, wherein the release rope extends from the portion of the removable release strap to a lower elevation of the building structure.

11. A fire protection device as defined in claim 9, wherein the release rope is fixedly attached to the removable release strap.

12. A fire protection device as defined in claim 1, wherein the protective cover includes a heat reflective coating on the outer surface of the protective cover.

13. A fire protection device as defined in claim 1, wherein the protective cover comprises a main cover for covering top, front, and back surfaces of the building structure and a plurality of end flaps for covering side surfaces of the building structure, the end flaps being foldably attached to the main cover.

14. A fire protection device as defined in claim 13, wherein a tie-down rope is attached on a portion of each end flap for positioning and securing the each end flap in position against the building structure.

15. A fire protection device as defined in claim 14, further comprising at least one anchoring member disposed proximate the building structure for securing the other end of the tie-down rope.

16. A fire protection device as defined in claim 13, wherein a retention tab is attached to a portion of at least one of the end flaps, the retention tab being configured to be held to a retention rope wound around a perimeter of the building structure.

17. A fire protection device as defined in claim 13, the main cover includes at least one venting hole.

18. A fire protection device as defined in claim 1, further comprising a fire-inhibiting gas stored in a storage tank disposed proximate the building structure.

19. A fire protection device as defined in claim 1, wherein the protective cover is custom-made to fit a geometric shape of the building structure.

20. A fire protection device as defined in claim 1, wherein the fire-suppressing gas released from the intumescent coating produces a fire-resistant foam between the protective cover and an exterior surface of the building structure.

21. A method of enveloping a building structure having at least one inclined top surface from an external fire, the method comprising:

providing a rolled fire-resistant protective cover having dimensions large enough to cover the building structure; the protective cover including an intumescent coating on the inner surface of the protective cover, the intumescent coating configured to release a fire-suppressing gas upon activation;

disposing the rolled protective cover inside a storage bag;

placing the storage bag on the inclined top surface; and releasing the rolled protective cover out of the storage bag, so that the rolled protective cover rolls down the top surface by gravity.

22. A method of enveloping a building structure as defined in claim 21, further comprising applying a heat reflective coating on an outer surface of the protective cover.

23. A method of enveloping a building structure as defined in claim 21, wherein the protective cover comprises a main cover for covering top, front, and back surfaces of the building structure and a plurality of end flaps for covering side surfaces of the building structure, the end flaps being foldably attached to the main cover.

24. A method of enveloping a building structure as defined in claim 23, further comprising unfolding the plurality of end flaps from the main cover to cover side surfaces of the building structure.

25. A method of enveloping a building structure as defined in claim 24, further comprising securing the plurality of end flaps in place against the side surfaces of the building structure.

26. A method of enveloping a building structure as defined in claim 21, further comprising releasing a fire-suppressing gas into a space between the protective cover and the building structure.

27. A method of enveloping a building structure as defined in claim 21, further comprising providing at least one venting hole on an upper portion of the protective cover.

28. A method of enveloping a building structure as defined in claim 21, wherein the fire-suppressing gas released from the intumescent coating produces a fire-resistant foam between the protective cover and an exterior surface of the building structure.

* * * * *